(12) United States Patent
Wang et al.

(10) Patent No.: US 7,889,993 B2
(45) Date of Patent: Feb. 15, 2011

(54) OPTICAL TRANSCEIVER MODULE HAVING A FRONT FACET REFLECTOR AND METHODS FOR MAKING AND USING A FRONT FACET REFLECTOR

(75) Inventors: Tak K. Wang, Saratoga, CA (US); Christopher Coleman, Santa Clara, CA (US)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 770 days.

(21) Appl. No.: 11/840,399

(22) Filed: Aug. 17, 2007

(65) Prior Publication Data

US 2009/0047024 A1 Feb. 19, 2009

(51) Int. Cl.
*H04B 10/00* (2006.01)
(52) U.S. Cl. .................... 398/138; 398/135
(58) Field of Classification Search .......... 398/135–139
See application file for complete search history.

(56) References Cited

U.S. PATENT DOCUMENTS

| | | | | |
|---|---|---|---|---|
| 4,718,052 A * | 1/1988 | Kondo et al. | ............. | 369/44.12 |
| 4,733,094 A * | 3/1988 | Carpentier et al. | .......... | 250/551 |
| 4,885,734 A * | 12/1989 | Yuzo | ...................... | 369/44.23 |
| 4,945,525 A * | 7/1990 | Yamamoto et al. | ........ | 369/44.12 |
| 5,032,219 A | 7/1991 | Buchmann et al. | | |
| 5,180,909 A * | 1/1993 | Ohyama et al. | ............. | 250/216 |
| 5,247,167 A * | 9/1993 | Bargerhuff et al. | ........ | 250/208.1 |
| 5,410,468 A * | 4/1995 | Horinouchi | .............. | 369/44.23 |
| 5,432,537 A * | 7/1995 | Imakawa et al. | ............ | 347/135 |
| 5,528,407 A * | 6/1996 | Nakata et al. | ............... | 398/136 |
| 5,598,394 A * | 1/1997 | Hibino et al. | ............. | 369/112.2 |
| 5,689,108 A * | 11/1997 | Ohyama | .................... | 250/239 |
| 5,696,862 A * | 12/1997 | Hauer et al. | .................. | 385/88 |
| 5,793,785 A * | 8/1998 | Nakanishi et al. | ............. | 372/36 |
| 5,809,050 A * | 9/1998 | Baldwin et al. | .......... | 372/50.21 |
| 5,812,581 A * | 9/1998 | Cox | ......................... | 372/50.21 |
| 5,898,167 A * | 4/1999 | Musha et al. | ............. | 250/201.5 |
| 5,912,456 A * | 6/1999 | Melendez et al. | ........... | 250/216 |
| 5,956,312 A * | 9/1999 | Ishihara | .................. | 369/112.21 |
| 5,995,692 A | 11/1999 | Hamakawa et al. | | |
| 5,999,320 A * | 12/1999 | Shirasaki | ..................... | 359/577 |
| 6,072,607 A * | 6/2000 | Tajiri et al. | .................... | 359/15 |
| 6,417,107 B1 * | 7/2002 | Sekimura | .................... | 438/689 |
| 6,442,182 B1 * | 8/2002 | Govorkov et al. | ...... | 372/29.021 |
| 6,459,711 B1 * | 10/2002 | Hamaguchi et al. | .......... | 372/36 |
| 6,504,812 B2 * | 1/2003 | Taniguchi et al. | ........... | 369/121 |
| 6,526,076 B2 * | 2/2003 | Cham et al. | ............. | 372/29.011 |
| 6,556,608 B1 * | 4/2003 | Gilliland et al. | ............ | 372/50.1 |
| 6,654,393 B2 * | 11/2003 | Hamasaki et al. | ......... | 372/29.02 |
| 6,795,459 B2 * | 9/2004 | Tsai | ............................ | 372/28 |
| 6,895,147 B2 * | 5/2005 | Posamentier | ................. | 385/47 |
| 6,912,363 B2 * | 6/2005 | Furuichi et al. | ............. | 398/192 |
| 6,925,256 B1 * | 8/2005 | Heiney | ........................ | 398/42 |
| 6,983,005 B2 * | 1/2006 | Masui et al. | ................ | 372/109 |

(Continued)

*Primary Examiner*—Agustin Bello (57) ABSTRACT

A reflector for use in an optical transceiver module and methods for making and using the reflector are provided. The methods for making the reflector reduce the amount of processing and handling of the wafer that are required, thereby reducing manufacturing costs and increasing yield. The reflector may have a diffraction-inducing structure formed thereon such that light received from the light source is redirected in a plurality of directions, including toward a lens that couples light into an end of a transmit fiber and in at least one other direction for being sensed by a detector that converts the detected light into electrical energy.

15 Claims, 7 Drawing Sheets

U.S. PATENT DOCUMENTS

| | | | |
|---|---|---|---|
| 7,038,994 B1* | 5/2006 | Taniguchi et al. | 369/112.01 |
| 7,136,409 B2* | 11/2006 | Ikehara et al. | 372/102 |
| 7,223,952 B2* | 5/2007 | Steegmuller et al. | 250/201.5 |
| 7,236,707 B2* | 6/2007 | Shahar | 398/140 |
| 7,248,617 B2* | 7/2007 | Volodin et al. | 372/102 |
| 7,263,112 B2* | 8/2007 | Oomori et al. | 372/36 |
| 7,283,571 B2* | 10/2007 | Wang et al. | 372/29.02 |
| 7,429,725 B2* | 9/2008 | Tawa | 250/216 |
| 7,466,729 B2* | 12/2008 | Kathman et al. | 372/29.01 |
| 7,467,897 B2* | 12/2008 | Hauffe et al. | 385/88 |
| 7,481,545 B2* | 1/2009 | Wang | 359/871 |
| 7,496,120 B2* | 2/2009 | Wang et al. | 372/29.02 |
| 7,525,895 B2* | 4/2009 | Nemoto | 369/112.01 |
| 7,675,624 B2* | 3/2010 | Chinowsky et al. | 356/445 |
| 2002/0024916 A1* | 2/2002 | Ueyama et al. | 369/112.04 |
| 2002/0029975 A1* | 3/2002 | Westra et al. | 205/116 |
| 2002/0051270 A1* | 5/2002 | Tatsuno et al. | 359/187 |
| 2002/0150341 A1* | 10/2002 | Te Kolste et al. | 385/48 |
| 2004/0179784 A1* | 9/2004 | Vancoille et al. | 385/47 |
| 2005/0249509 A1* | 11/2005 | Nagarajan et al. | 398/198 |
| 2006/0153058 A1* | 7/2006 | Takahashi et al. | 369/300 |
| 2006/0198404 A1* | 9/2006 | Henrichs | 372/29.02 |
| 2006/0262816 A1* | 11/2006 | Kathman et al. | 372/29.01 |
| 2008/0089697 A1* | 4/2008 | Shen et al. | 398/183 |
| 2009/0047024 A1* | 2/2009 | Wang et al. | 398/135 |

* cited by examiner

OPTICAL TRANSCEIVER MODULE HAVING A FRONT FACET REFLECTOR AND METHODS FOR MAKING AND USING A FRONT FACET REFLECTOR

TECHNICAL FIELD OF THE INVENTION

The invention relates to reflectors used in optical transceiver modules to reflect light produced by one or more lasers of the transceiver module. More particularly, the invention relates to a front facet reflector and methods of making and using the front facet reflector.

BACKGROUND OF THE INVENTION

In optical communications networks, transceivers are used to transmit and receive optical signals over optical fibers. On the transmit side of the transceiver, a laser of the transceiver generates amplitude modulated optical signals that represent data, which are then transmitted over an optical fiber coupled to the transmit side of the transceiver module. Various types of semiconductor lasers are used for this purpose, including, for example, Vertical Cavity Surface Emitting Lasers (VCSELs) and edge emitting lasers, which may be her divided into subtypes that include Fabry Perot (FP) and Distributed Feedback (DFB) lasers.

Various types of optics systems are used in optical transceivers for directing the light produced by the laser in one or more directions. A typical type of optics system of a known optical transceiver module includes one or more elements that direct light beams produced by the laser into the end of an optical fiber and one or more elements that direct a portion of the light produced by the laser onto one or more optical monitoring detectors, which are typically one or more monitoring photodiodes. One type of monitor photodiode is used to monitor the optical output power of the laser and produces an electrical feedback signal that is fed back to the transceiver controller. The transceiver controller processes the electrical feedback signal and adjusts the bias current of the laser, if necessary, to maintain the laser output power level at a desired average output power level.

Figure 1:
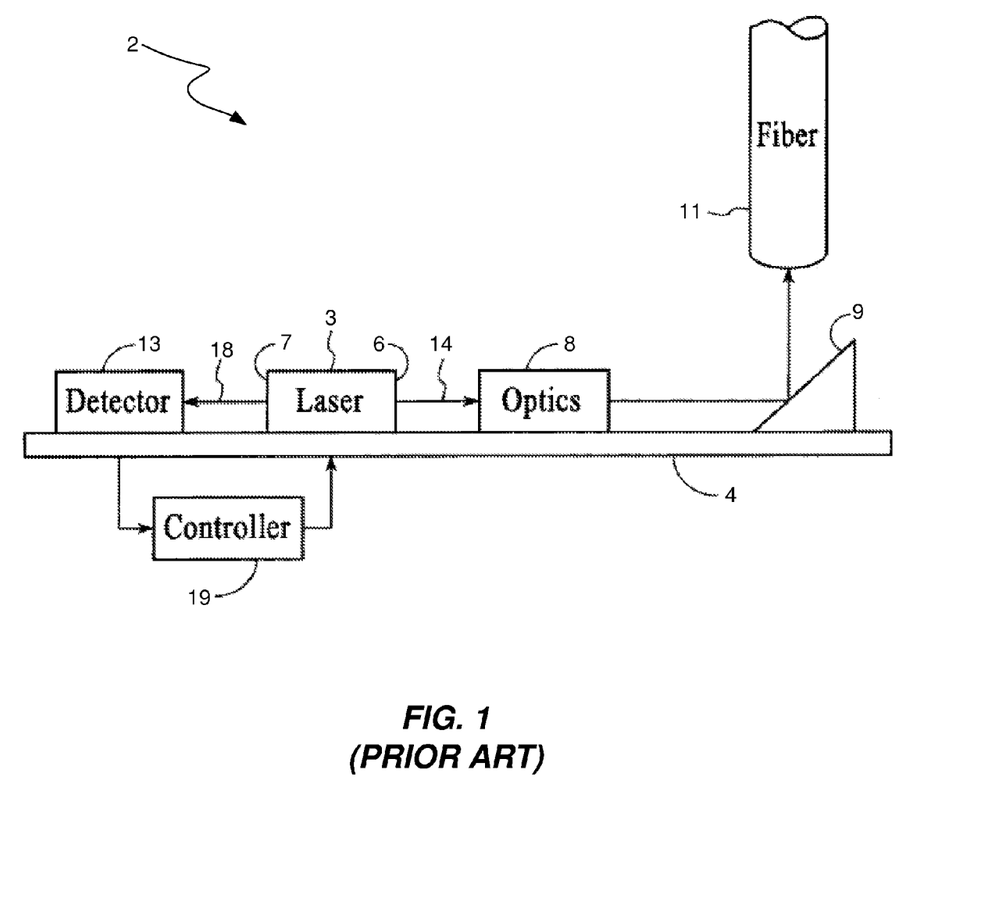
FIG. 1 illustrates a block diagram of components of the transmit side of a known optical transceiver module.

FIG. 1 illustrates a block diagram of a portion of a transmit side of a known optical transceiver module 2 having a known optics system. The transceiver module 2 uses an edge emitting laser diode 3 as the light source for generating an optical data signal. The laser diode 3 is mounted on a substrate 4, which is normally referred to as the submount assembly of the transceiver module 2. The laser diode 3 emits an output light beam 14 from a front facet 6 of the laser diode 3 and emits a monitoring light beam 18 from a rear facet 7 of the laser diode 3. The output beam emitted from the front facet 6 is directed through an element 8 of an optics system, such as a collimating lens, which collimates the output beam. A 45° mirror 9 of the optics system reflects the collimated beam at an angle of 90° relative to the angle of incidence so that it is directed normal to the surface of the substrate 4 onto an end of a transmit optical fiber 11.

The monitoring light beam emitted from the rear facet 7 of the laser diode 3 is directed onto a detector 13, which is normally a photodiode. The detector 13 generates an electrical signal indicative of the power of the output monitoring beam. Because there is a known relationship between the power of the output beam 14 and the power of the monitoring beam 18, the signal generated by the detector 13 may be used to determine the power level of the signal directed into the end of the fiber 11. A transceiver module controller 19 processes the electrical feedback signal output from the detector 13 and outputs a control signal to the laser diode 3 that causes the laser diode 3 to adjust its bias current to maintain the output power level of the beam 14 at a particular level.

While the monitoring and controlling techniques described with reference to FIG. 1 generally operate well for their intended purpose, there is room for improvement. For example, the known ratio of the power of the two beams 14 and 18 is less reliable with respect to maintaining the output power to the fiber 11 if the output beam 14 is manipulated in a manner different than the manner in which the monitoring beam 18 is manipulated. For example, in an Externally Modulated Laser (EML), the modulation which occurs for telecommunications or other applications does not affect the monitoring beam 18. Thus, the feedback signal out from the detector 13 and provided to the controller 19 will not show all fluctuations in the output power level of the beam reflected by the mirror 9 into the end of the fiber 11.

In addition, the processes that have been used to make the 45° mirrors for use in optical transceiver modules are generally tedious, prone to human error and expensive. One known approach to fabricating a small-scale mirror is to use anisotropic etching of silicon. Certain wet etchants, such as potassium hydroxide (KOH), will etch primarily in the direction of the crystal plane. The section entitled "Description of the Related Art" in U.S. Pat. No. 6,417,107 to Sekimura describes one known etching technique for forming a 45° mirror. A silicon ingot may be sliced at an angle to obtain a <100> silicon wafer which is 9.74° off-axis. Without the oblique cut, the wet etchant would etch at an angle of 54.74°. However, the off-axis silicon substrate etches at an angle of precisely 45° (54.74°-9.74°). The etching angle is determined by the orientation of the <111> crystallographic plane, which typically has a very slow etch rate. This property enables the <111> crystallographic plane to be used as an etch stop. Thus, in the 45° mirror, the reflective surface is along the <111> crystalline plane.

There are a number of factors that affect the planarity (i.e., smoothness) of the resulting <111> crystallographic plane. Techniques have been introduced to increase the planarity. It is a common practice to add a surfactant into the etchant in order to improve surface smoothness. For example, isopropyl alcohol may be introduced into the KOH. As another, arsenic salt has been added to passivate and smooth the etched surface. The Sekimura patent describes using an etchant of KOH or tetramethylammonium hydroxide (TMAH) with a non-ion type surface active agent, such as polyoxyethylene alkyl phenyl ether. It is also known to introduce an impurity into the silicon crystal itself in order to reduce roughness on the surface.

Annealing a rough silicon surface in a reduced pressure hydrogen atmosphere can improve the smoothness of a silicon substrate. It is possible that the planarity of a mirror surface may be improved after it is formed, if the anneal is applied. During the etching process, planarity can be improved by reducing or eliminating the occurrence of bubbling on the silicon surface. Hence, either oxygen or hydrogen gas can be bubbled into the etching bath.

Other concerns in the etching of silicon to form a 45° mirror relate to the tediousness and the repeatability of the process. Photo masks are typically used in conjunction with lithography during the etching process. Accurate alignment of the photo mask to the crystal axis normally includes a two-step etching approach. The first etching step reveals the true crystal orientation. Then, the second etching step requires precisely aligning the etching mask to the revealed crystal orientation prior to etching. The process is tedious, subjective and expensive. In addition, the necessity of using a special cut silicon wafer further increases costs. Furthermore, if the crystal is not precisely aligned during the lithography process, the etching process will result in steps being formed on the mirror surface. Because the etched wafer is very fragile and the entire process requires a lot of handling of the wafer, wafer fracturing resulting in yield loss is expected.

Accordingly, a need exists for an optical transceiver module having a 45° mirror that provides improved optical power monitoring capabilities, and an improved method for making a 45° mirror.

SUMMARY OF THE INVENTION

The invention is directed to an optical transceiver module having a front facet reflector and methods for making and using the reflector. The optical transceiver module comprises a light source, a light source driver, a reflector, and at least a first detector. The light source is configured to receive a modulation signal produced by the light source driver and to produce an optical data signal based on the received modulation signal. The reflector receives light corresponding to the optical data signal produced by the light source and includes a mirroring surface and a diffraction-inducing structure. The mirroring surface reflects at least a portion of the received light in a first direction and the diffraction-inducing structure diffracts at least a portion of the received light in at least a second direction that is different from the first direction. The detector receives at least a portion of the light diffracted in the second direction and converts the received diffracted light into electrical energy.

In accordance with an embodiment, the reflector comprises a mirroring surface, a diffraction-inducing structure formed on or in the mirroring surface, and a mounting surface for mounting the reflector to a submount assembly of an optical transceiver module. The mounting surface is at substantially a 45° angle relative to the mirroring surface. Light that is incident on the mirroring surface having the diffraction-inducing structure on or in it is redirected away from the mirroring surface as +1 order light, 0 order light and −1 order light. The 0 order light corresponds to light that is redirected in a first direction that is at substantially a 90° angle relative to the mounting surface. The +1 order light corresponds to light that is redirected in a second direction that is different from the first direction. The −1 order light corresponds to light that is redirected by the diffraction grating in a third direction that is different from the first and second directions.

The method of using the reflector in an optical transceiver module comprises providing a reflector in an optical transceiver module and positioning the reflector to receive at least a portion of light produced by a light source of the transceiver module. The reflector has at least a mirroring surface and a mounting surface, with a diffraction-inducing structure formed on or in the mirroring surface. The mounting surface of the reflector is mounted to a submount assembly of the optical transceiver module. The mounting surface is at substantially a 45° angle relative to the mirroring surface. The mirroring surface reflects at least a portion of the received light in a first direction, and the diffraction-inducing structure diffracts at least a portion of the received light in at least a second direction that is different from the first direction. A detector is provided in the optical transceiver module for receiving at least a portion of the light redirected in the second direction and converting the received redirected light into electrical energy.

The method of making a 45° reflector for use in an optical transceiver module comprises placing a metal layer on at least a portion of a polished surface of a wafer, using a blade having sides that are at a 45° angle relative to each other to cut at least partially through the wafer, and dicing the wafer with a straight blade to singulate the wafer into multiple 45° reflectors. Dicing the wafer with the straight blade to singulate the wafer results in each 45° reflector having one side that forms a mounting surface and at least one other side that forms a mirroring surface. The mirroring surface of each respective reflector is at least substantially at a 45° angle relative to the respective mounting surface of the reflector. Each respective mirroring surface comprises a respective portion of the metal layer.

These and other features and advantages of the invention will become apparent from the following description, drawings and claims.

DETAILED DESCRIPTION OF AN ILLUSTRATIVE EMBODIMENT

In accordance with various embodiments that will be described herein, the optical transceiver module has an optics system comprising a 45° mirror that includes a diffraction-inducing structure. A portion of the light emitted from the front facet an edge emitting laser diode is reflected by the mirror at an angle of 90° to the angle of incidence toward the end of a transmit optical fiber. A portion of the light emitted from the front facet is diffracted by the diffraction-inducing structure of the mirror in at least one direction and directed onto at least one detector. The detector produces an electrical feedback signal based on the light received by it, which is fed back to a transceiver module controller. The transceiver module controller processes the feedback signal and makes at least one determination about the light being emitted from the front facet of the laser. Because the controller is making the determination based on a portion of the light beam emitted from the front facet, the aforementioned problem associated with the known monitoring technique described above with respect to FIG. 1 are avoided.

The term "optical transceiver module" is used herein to denote a transceiver module that produces optical signals that represent data and transmits them over an optical waveguide from the module and that receives optical signals that represent data that have been transmitted to the optical transceiver module over an optical waveguide. Many of the operations that occur within the module are operations that are performed on electrical signals in the electrical domain. Therefore, the term "optical transceiver module" is not intended to be limited to transceiver modules in which operations are performed exclusively in the optical domain, although the invention would apply equally to such transceiver modules. Also, the term "optical transceiver module", as that term is used herein, is intended to include modules that only include either the transmitter portion or the receiver portion of a transceiver module.

Figure 2:
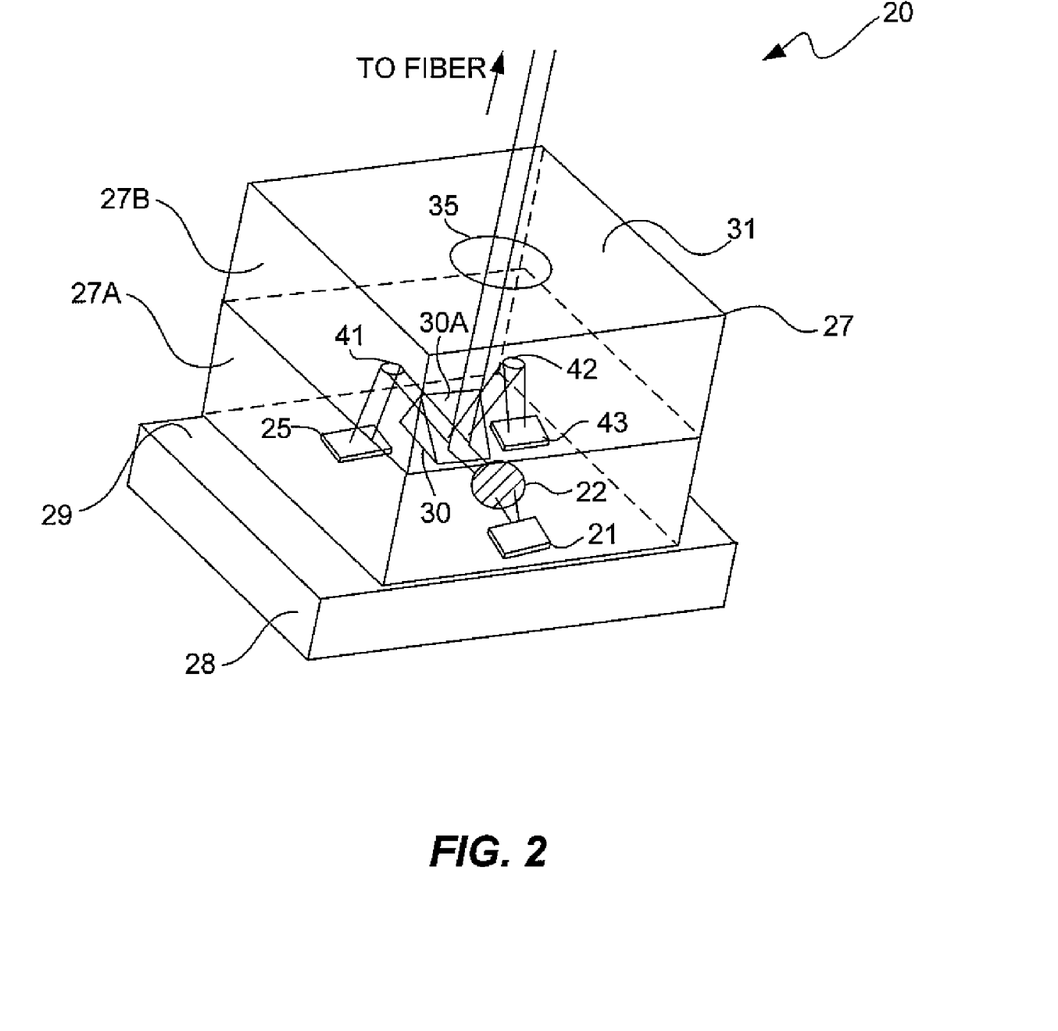
FIG. 2 illustrates a block diagram of a portion of the transmit side of a transceiver module in accordance with an embodiment in which a single detector uses a diffracted portion of a light beam produced by a laser to monitor the laser output.

FIG. 2 illustrates a block diagram of a portion 20 of the transmit side of an optical transceiver module in accordance with an embodiment. The transceiver module portion 20 includes a laser 21, which is typically an edge emitting laser diode, a lens 22, which is typically a ball lens, a 45° mirror 30 having a diffraction-inducing structure (not shown) therein, and an optical detector 25, which is typically a photodiode that is sensitive to the wavelength of light produced by the laser diode 21. The portion 20 of the transceiver module includes a substrate 28, also referred to herein as the submount assembly, on which the components 21, 22, 25, and 30 are secured by, for example, epoxy. Components 21 and 25 are typically attached by AuSn (gold tin) solder.

The portion 20 of the transceiver module also includes a lid 27, which typically comprises a lower lid portion 27A and an upper lid portion 27B. A lens 35 is formed in the top surface 31 of the upper lid portion 27B. The lid 27 is hermetically sealed to the top surface 29 of the submount assembly 28 and encompasses the components 21, 22, 25, and 30 of the portion 20 of the transceiver module in a hermetically sealed environment. For ease of illustration, other components that will normally be mounted to or formed in the submount assembly 28 are not shown in FIG. 2. For example, electrical traces, contact pads and wire bond leads are typically mounted on or in the submount assembly 28 for routing electrical signals to and from components 21 and 25. Also, other components that are not shown such as resistors and capacitors, for example, may also be mounted on or in the submount assembly 28.

Although the lid 27 has a lower portion 27A and an upper portion 27B, these portions are normally integrally formed during the manufacturing process by which the portion 20 of the transceiver module is made. In accordance with an embodiment, the lower lid portion 27A is made of glass (e.g., Pyrex® glass) and the upper lid portion 27B is made of silicon. The choice of material for the lower and upper lid portions 27A and 27B depends on the wavelength of interest in a given technological application. In accordance with this embodiment, silicon is used for the upper lid portion because silicon is transparent to the wavelength of interest and also because it is easier to form the lens 35 in silicon than it is to form it in Pyrex® glass.

The collimated beam passing out of the ball lens 22 is incident on the angled surface 30A of the 45° mirror 30. The surface 30A is at a 45° angle with reference to the plane of the upper surface 29 of the submount assembly 28. A diffraction-inducing structure (not shown), such as a diffraction grating, for example, on the mirror 30 diffracts portions of the light beam incident on the surface 30A into the +1, 0 and −1 orders. The 0 order is at a 90° angle relative to the plane of the surface 29 of the submount assembly 28 and passes through the lens 35, which focuses the light into the end of a transmit fiber (not shown). The +1 order is reflected off of the bottom of the upper lid portion 27B at the location designated by numeral 41 and is incident on the upper surface of the detector 25. The light that is incident on the upper surface of the detector 25 passes through an aperture (not shown) formed in the upper surface of the detector 25 and is converted from optical energy into electrical energy by the detector 25.

The electrical energy produced by the detector 25 is typically amplified by an amplifier circuit (not shown) and fed back to the transceiver module controller (not shown) for processing. The transceiver module controller performs an algorithm that uses this feedback value and the known relationship of the intensity of the diffracted light to the intensity of the beam of light produced by the laser diode 21 to determine the intensity and beam of light produced by the laser diode 21 and coupled into the end of the transmit fiber. The controller causes the bias current of the laser diode to be adjusted to maintain the intensity of the beam of light being coupled by the lens 35 into the end of the transmit fiber at a particular level, which is typically a constant average intensity level.

The −1 order of the diffracted is reflected off of the bottom of the upper lid portion 37B at the location designated by numeral 42 and is incident on the upper surface of another component 43 of the transceiver module portion 20. In cases where there is no need to use the −1 order of the diffracted light, the light may simply be lost and ignored. Those skilled in the art of diffraction grating design will note, in view of the description provided herein, that the grating may be designed in such a way that the unused order has no or little power so as to improve efficiency. As will be described below with reference to FIG. 3, the −1 order light may be used to control the wavelength of the light produced by the laser.

Figure 3:
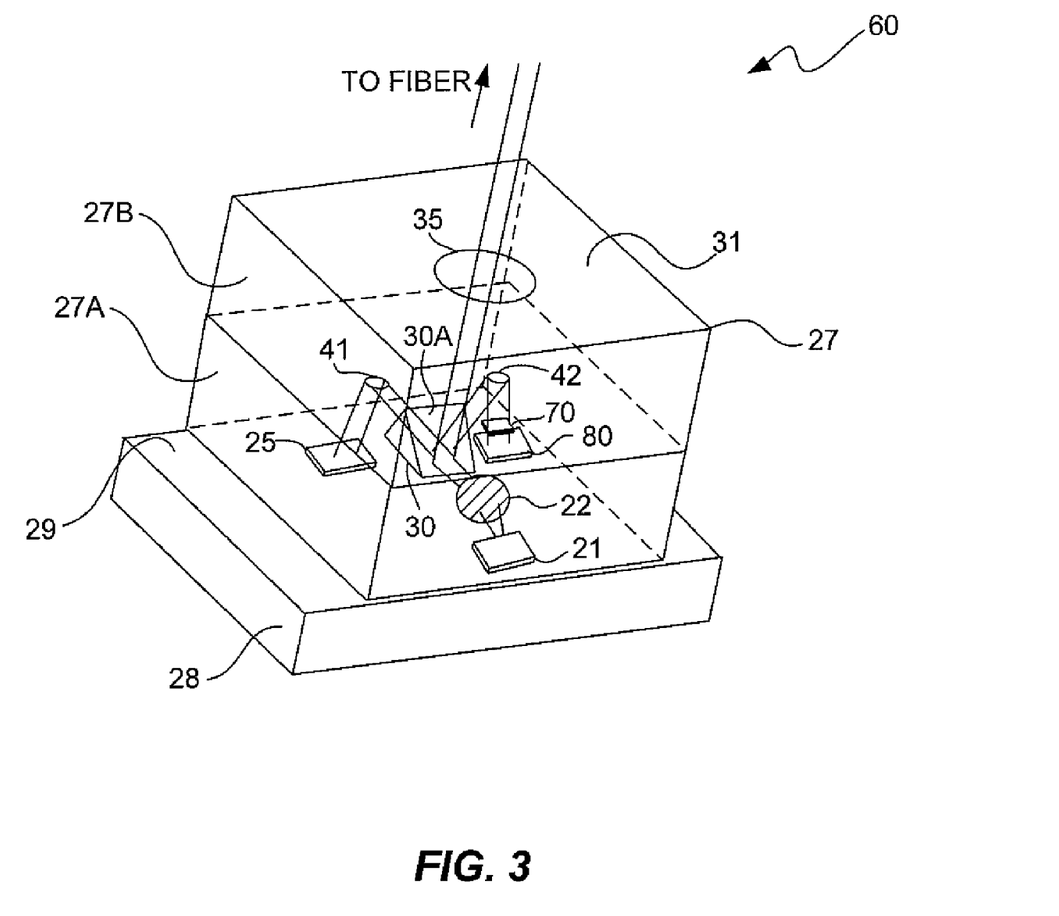
FIG. 3 illustrates a block diagram of a portion of the transmit side of a transceiver module in accordance with another embodiment in which multiple detectors are used to monitor multiple diffracted portions of a light beam produced by a laser to monitor both the intensity level of the light produced by the laser as well as the wavelength of the light produced by the laser.

FIG. 3 illustrates a block diagram of a portion 60 of the transmit side of a transceiver module in accordance with another embodiment in which multiple detectors are used to monitor both the intensity level of the light produced by the laser diode as well as the wavelength of the light produced by the laser diode. This allows both the intensity level and wavelength of the light produced by the laser to be controlled. For ease of discussion, the components 21, 22, 25, 27, and 30 shown in FIG. 3 are assumed to be identical to the like-numbered components shown in FIG. 2. In addition to these components, the transceiver module portion 60 includes a wavelength filtering device 70 and a detector 80. The wavelength filtering device 70 receives the −1 order light reflected from the bottom of the upper lid portion 27B at the location designated by numeral 42. The intensity of light that passes through this filtering device 70 varies with the wavelength of the input light. The filtered light is then incident on an aperture (not shown) formed in the upper surface of the detector 80. The detector 80 converts this optical energy into electrical energy. Due to the filtering device 70, the electrical output of the detector 80 depends on both the input intensity of the light input to the filtering device 70 and the wavelength of the input light. Like the electrical energy produced by detector 25, the electrical energy produced by detector 80 is fed back to the transceiver module controller (not shown) for processing.

Wavelength control of the laser diode 21 is achieved by dynamically adjusting the temperature of the laser diode 21. The temperature of the laser diode 21 can be adjusted by, for example, adjusting an electrical current applied to a resistive element (not shown) on the submount assembly 28 to cause the submount assembly 28 to increase or decrease in temperature, thereby increasing or decreasing the temperature of the laser diode 21. However, the temperature of the laser diode 21 is more commonly controlled by a Thermal Electric Cooler (not shown), which is capable of both heating and cooling the laser diode 21. U.S. application Ser. No. 11/251,346 filed on Oct. 14, 2005 discloses embodiments that use multiple detectors to monitor reflection and diffraction of output beams of a laser diode of an optical transceiver module to determine adjustments to be made to the bias current and temperature of the laser diode. In that application, a diffraction-inducing structure located on the lid diffracts light reflected onto the lid by a 45° mirror. U.S. application Ser. No. 11/251,346, which is assigned to the assignee of the present application, is incorporated herein by reference in its entirety.

Having described a few illustrative embodiments of an optical transceiver module that includes a 45° mirror having a diffraction-inducing structure, the processes for making the 45° mirror having the diffraction-inducing structure will now be described with reference to a few illustrative embodiments. As stated above, the current known process that is used to create 45° mirrors requires a specially cut silicon wafer and a tedious etching process. U.S. application Ser. No. 11/249,979 filed on Oct. 13, 2005 is directed to methods of forming and mounting an angled reflector, such as a 45° mirror, and overcomes certain disadvantages of the aforementioned known process. In general, the method disclosed in that application results in an etched first major surface that is used as a mounting surface and a second major surface having a metallic coating thereon that functions as the reflective surface of the mirror. The present invention provides a method that has certain improvements over the method disclosed in U.S. application Ser. No. 11/249,979, which is assigned to the assignee of the present application and which is incorporated by reference herein in its entirety.

Figure 4A:
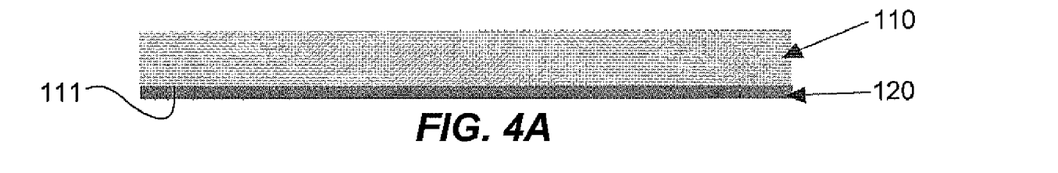
FIGS. 4A and 4B illustrate the process steps and materials used to make a 45° mirror in accordance with an embodiment, wherein the mirror does not include a diffraction-inducing structure.
Figure 4B:
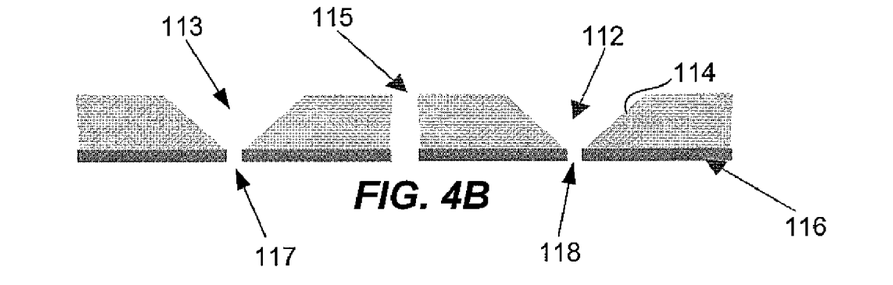
Figure 5:
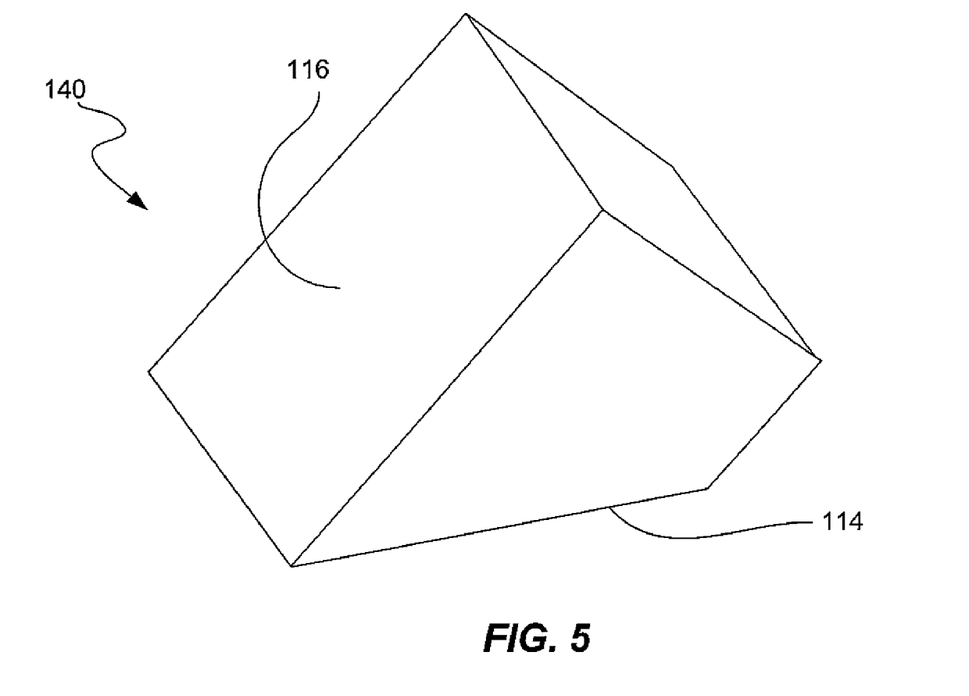
FIG. 5 illustrates a perspective view of a chip formed in the manner shown in FIGS. 4A and 4B after it has been singulated from the wafer.
Figure 6:
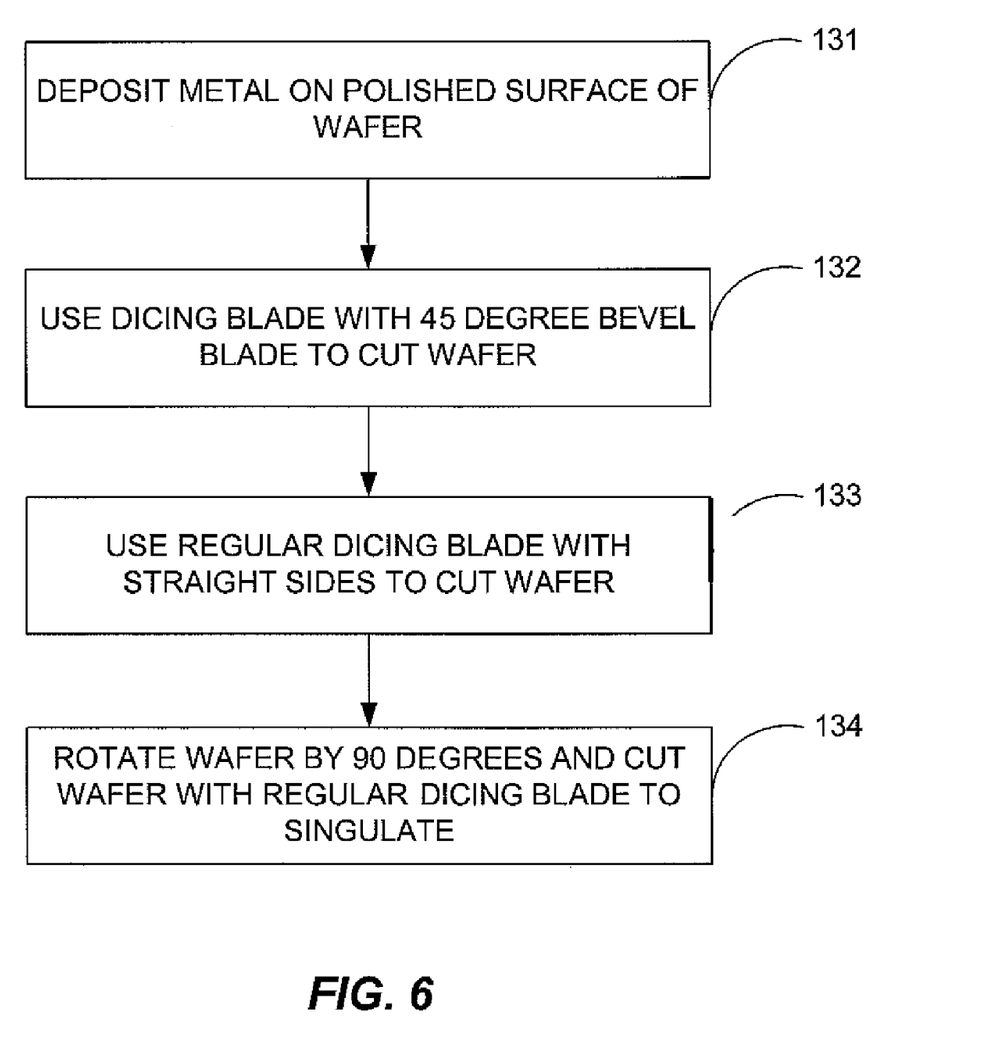
FIG. 6 illustrates a flowchart that demonstrates the flow of the process shown in FIGS. 4A and 4B in accordance with an embodiment.

FIGS. 4A and 4B illustrate the process steps and materials used to make a 45° mirror in accordance with an embodiment, wherein the mirror does not include a diffraction-inducing structure. FIG. 5 illustrates a perspective view of a chip after it has been singulated from the wafer. FIG. 6 illustrates a flowchart that demonstrates the flow of the process in accordance with an embodiment. With reference to FIG. 4A, a silicon wafer 110 of appropriate thickness is subjected to a physical vapor deposition (PVD) process during which an appropriate metal 120 is deposited on the polished surface 111 of the wafer 110. This step is represented in the flowchart shown in FIG. 6 by block 131. A dicing blade (not shown) that has 45° sides (i.e., 45° bevel blade) is used to cut through the wafer 110 at dicing locations 112 and 113 shown in FIG. 4B, which creates diced surfaces 114. The mirroring surface is surface 116. This step is represented in the flowchart shown in FIG. 6 by block 132. The wafer is then cut with a regular dicing blade with straight edges at dicing location 115. This step is represented in the flowchart shown in FIG. 6 by block 133. The wafer is then turned 90° (not shown) and cut with the straight blade at dicing locations 117 and 118 to singulate the chips. This step is represented in the flowchart shown in FIG. 6 by block 134.

FIG. 5 illustrates a perspective view of a chip 140 after it has been singulated, turned around and placed with the diced surface 114 down and the mirroring surface 116 facing up at a 45° angle to the diced surface 114. It is evident that the method described above with reference to FIGS. 4A, 4B and 6 is much less tedious than the methods described above that use etching. In addition, although the method disclosed in U.S. application Ser. No. 11/249,979 provides improvements over the method disclosed in U.S. Pat. No. 6,417,107 to Sekimura, both methods require the use of a specially cut wafer. In contrast, the method of making the reflector described above with reference to FIGS. 4A, 4B and 6 does not require the use of a specially cut wafer, nor does it require tedious masking and etching steps, which are also expensive. The method of making the reflector described above with reference to FIGS. 4A, 4B and 6 also applies to many other wafer materials, such as, for example glass, quartz, metal, and plastic.

Also, when the reflectors are made using the known etching process disclosed in U.S. Pat. No. 6,417,107, one of the etched surfaces is a 45° surface and the opposing etched surface is a 63° surface. Consequently, in theory, only half of the reflectors (those with the 45° surfaces) have the proper angle and can be used. In actuality, however, less than half of the reflectors are yielded because processing and handling result in fractures that further reduce yield. With the process described above with reference to FIGS. 4A, 4B and 6, both of the opposing sides that result when the 45° bevel blade is used have the proper angle and can therefore be used as mirroring surfaces. Therefore, the process increases yield while also reducing costs.

Figure 7A:
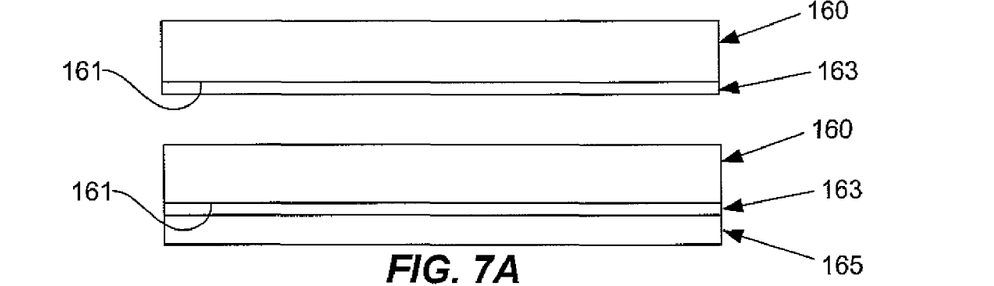
FIGS. 7A and 7B illustrate the process steps and materials used to make a 45° mirror that includes a diffraction-inducing structure in accordance with an embodiment.
Figure 7B:
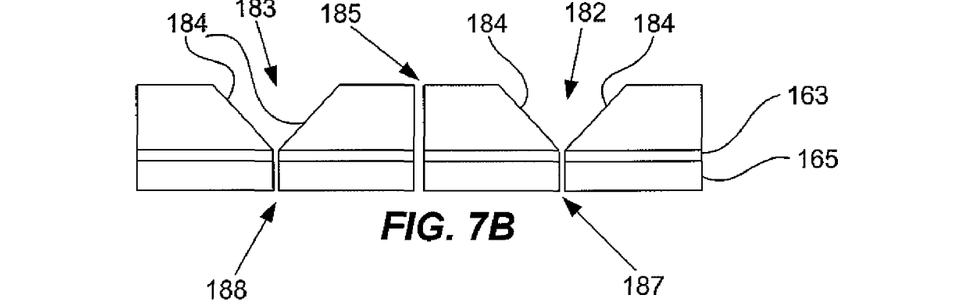
Figure 8:
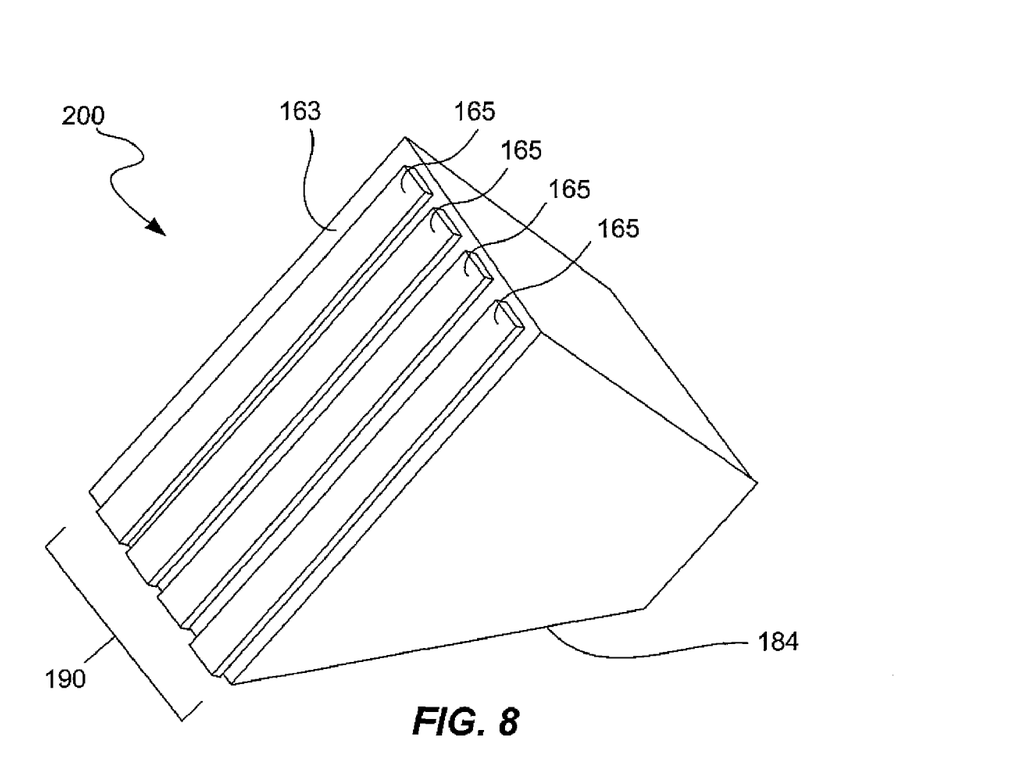
FIG. 8 illustrates a perspective view of a chip that is formed by the process represented by FIGS. 7A and 7B after it has been singulated from the wafer.
Figure 9:
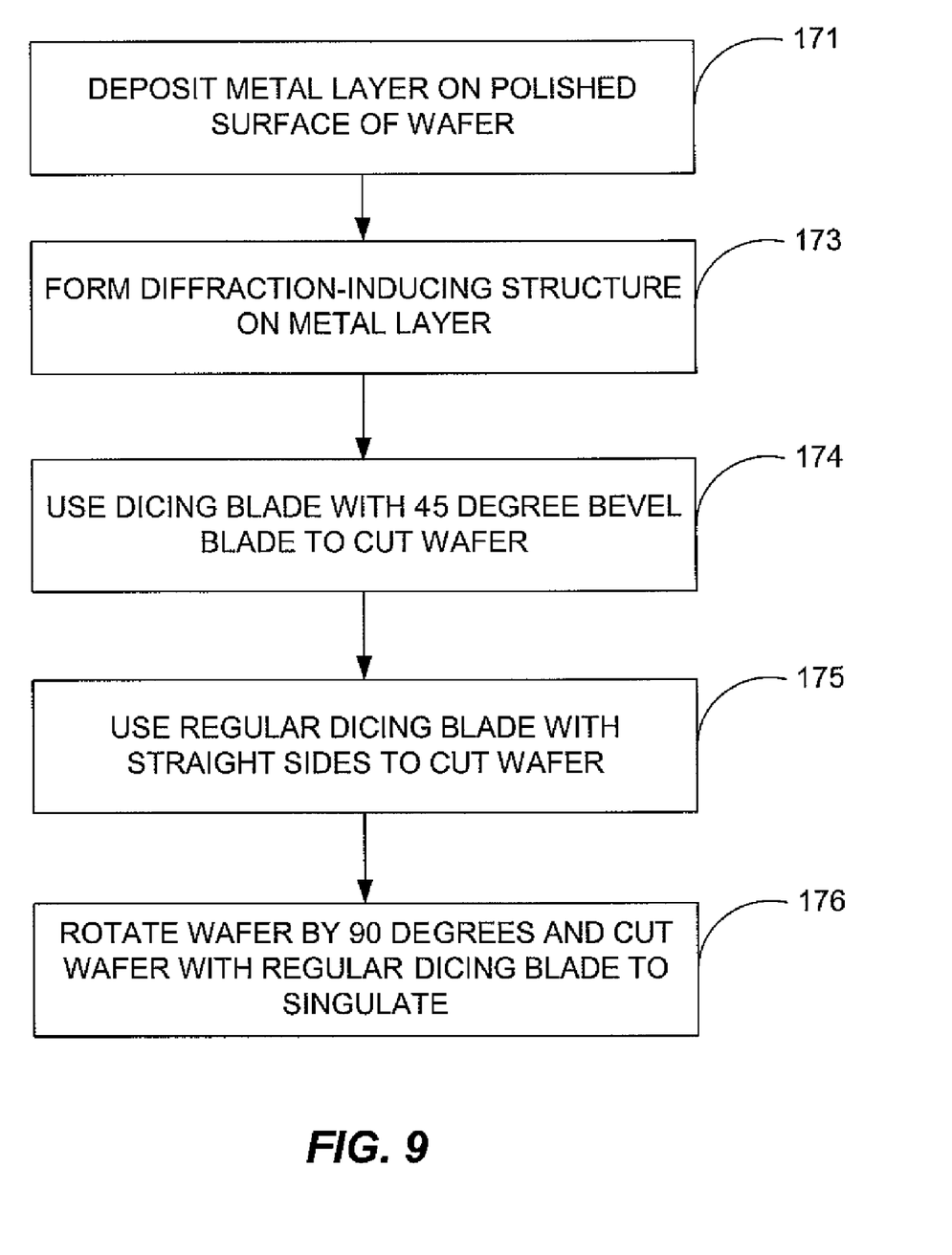
FIG. 9 illustrates a flowchart that demonstrates the flow of the process shown in FIGS. 7A and 7B.

FIGS. 7A and 7B illustrate the process steps and materials used to make a 45° mirror that includes a diffraction-inducing structure in accordance with an embodiment. In accordance with this embodiment, the diffraction-inducing structure is a diffraction grating. FIG. 8 illustrates a perspective view of a chip after it has been singulated from the wafer. FIG. 9 illustrates a flowchart that demonstrates the flow of the process corresponding to what is shown in FIGS. 7A and 7B. The method will now be described with reference to FIGS. 7A-9.

With reference to FIG. 7A, a layer of titanium-gold (TiAu) 163 is deposited on a polished side 161 of a silicon wafer 160. The wafer 160 is typically around 380 micrometers (microns) thick. Common thicknesses for silicon wafers are about 275 microns for a 2" (inch) diameter wafer, about 350 microns for a 3" diameter wafer, about 500 microns for a 4" diameter wafer, and about 675 microns for a 6" diameter wafer. Using larger diameter wafers will generally result in better yield. However, some technological applications require thin wafers to be used, which are fragile and thus may fracture during handling. In accordance with embodiments of the invention, thick wafers can be used to form the grating, and a grinding step can be used on the side of the wafer that does not include the grating. The wafer having the grating on one side thereof can then be diced again to form the chip. Thus, the invention allows any wafer having any diameter and thickness to be used.

The TiAu layer 163 typically has a thickness that ranges from approximately 500 angstrom to approximately 1,000 angstrom. Block 171 in FIG. 9 represents the step of depositing the TiAu layer on the polished side of the wafer. The TiAu layer 163 constitutes the mirroring surface. After the mirroring surface has been formed, a diffraction-inducing structure 165 is formed on the mirroring surface 163. Several methods can be used to create a diffraction-inducing structure on the mirroring surface 163. The invention is not limited to using any particular method for adding the diffraction-inducing structure 165 to the mirroring surface 163. The step of forming the diffraction-inducing structure 165 is represented by block 173 in FIG. 9.

In accordance with an embodiment, the diffraction-inducing structure 165 is a diffraction grating that operates on light in accordance with Bragg's Law. The diffraction grating is created by patterning the mirroring surface 163 with photoresist, etching the areas of the surface 163 that are exposed through the patterned photoresist, removing the photoresist, and then performing a metallization process such as PVD to deposit a metal layer over the etched surface. The periodic variations in the height of the deposited metal layer provide the diffraction grating. PVD typically includes both sputtering and evaporation. Metals are rarely deposited using chemical vapor deposition (CVD). There are metallo-organic CVD (MOCVD) processes that are used to deposit metal, but they generally are not used for relatively simple technical applications of the type being described herein. This is not to say that such processes could not be used, but only that it is not necessary to use such processes and that other processes may be more suitable for these purposes.

It should be noted that that the diffraction-inducing structure can have an arbitrary shape and profile. The diffraction pattern depends on the shape and profile of the diffraction-inducing structure. The shape and profile of the diffraction-inducing structure controls how much power is in each of the orders (the −1, 0 and +1). In theory, there are an infinite number of orders, and persons skilled in the art of diffraction optics design can design diffraction-inducing structures that diffract light in selected orders. For example, an optics engineer may decide that the −3, 0 and +3 orders are more appropriate and therefore design a grating (within the bounds of physics) that uses these orders instead of the −1, 0, +1 orders.

For applications in fiber optics communications, a deep grating is not required. In such cases, a lift-off process can be used to fabricate the shallow grating. In accordance with this method, a layer of an appropriate metal such as gold, for example, is deposited on the polished surface of the wafer. A grating is then patterned on the metallized surface with photoresist. The wafer 160 is then put in the evaporator again, and gold is evaporated onto the surface having the patterned photoresist thereon. Upon completing the second evaporation step, the photoresist is removed. When the photoresist is removed, the gold on the surface of the photoresist is also removed. However, the gold that was deposited on the gold surface during the second vapor deposition step will remain on the wafer, thereby forming a diffraction grating.

After the grating has been formed, the wafer can be thinned and diced as described above. A dicing blade (not shown) that has 45° sides (i.e., 45° bevel blade) is used to cut through the wafer 110 at dicing locations 182 and 183 shown in FIG. 7B, which creates diced surfaces 184. This step is represented in the flowchart shown in FIG. 9 by block 174. The wafer is then cut with a regular dicing blade with straight edges at dicing location 185. This step is represented in the flowchart shown in FIG. 9 by block 175. The wafer is then turned 90° (not shown) and cut with the straight blade at dicing locations 187 and 188 to singulate the chips. This step is represented in the flowchart shown in FIG. 9 by block 176.

FIG. 8 illustrates a perspective view of a chip 200 after it has been singulated. The mirroring surface now comprises the diffraction grating 190, which is made up of the surface variations 165 on reflective surface 163. The 45° diced surface 184 is mounted to the submount assembly of the transceiver module when used in the manner described above with reference to FIGS. 2 and 3. The mirroring surface comprising surface 163 and periodic variations 165 faces up at a 45° angle to the 45° diced surface 184.

It should be noted that the apparatuses and methods have been described with reference to a few illustrative embodiments for the purposes of demonstrating the principles and concepts of the invention and to provide a few examples of the manner in which they may be implemented. The methods and apparatuses are not limited to these embodiments, as will be understood by persons skilled in the art in view of the description provided herein. The methods and apparatuses also are not limited to being used in an optical transceiver module, but may be used in any type of device for any suitable purpose. Also, while certain materials and processes have been described herein as being used to make the reflectors, the invention is not limited with respect to the materials and processes described herein. In addition, while the transceiver modules have been described as using laser diodes, any kind of suitable light source may be used, including, for example, light emitting diodes (LEDs) and other devices. Likewise, while the transceiver modules have been described as using photodiodes for the detectors, any type of device that is suitable for sensing optical energy and converting it into electrical energy may be used for this purpose. Those skilled in the art will understand that modifications may be made to the embodiments described herein and that all such modifications are within the scope of the invention.

What is claimed is:

1. An optical transceiver module comprising:
    a light source configured to receive a modulation signal and to produce an optical data signal based on the received modulation signal;
    a light source driver configured to produce the modulation signal based on an electrical data signal received by the light source driver;
    a reflector, the reflector receiving light corresponding to the optical data signal produced by the light source, the reflector including a mirroring surface and a diffraction-inducing structure, wherein the diffraction-inducing structure is formed on or in the mirroring surface, the mirroring surface reflecting at least a portion of the received light in a first direction, the diffraction-inducing structure diffracting at least a portion of the received light in at least a second direction, the second direction being different from the first direction; and
    at least a first detector, the first detector receiving at least a portion of the light diffracted in the second direction and converting the received diffracted light into electrical energy.

2. The optical transceiver module of claim 1, wherein the reflector includes at least a first surface and a second surface, the first surface corresponding to the mirroring surface, the second surface being mounted to a submount assembly of the transceiver module, the second surface being at a 45° angle relative to the first surface.

3. The optical transceiver module of claim 2, wherein the diffraction-inducing structure is a diffraction grating formed on or in the first surface.

4. The optical transceiver module of claim 3, wherein the first surface having the diffraction grating thereon diffracts +1 order light, 0 order light and −1 order light, the 0 order light corresponding to light reflected in said first direction, the +1 order light corresponding to light diffracted in said second direction, the −1 order light corresponding to light diffracted by the diffraction grating in a third direction, wherein the light diffracted in said second direction is reflected off of a reflective surface of the transceiver module and directed toward the detector such that the light received by the detector is the light reflected off of the reflective surface of the transceiver module.

5. The optical transceiver module of claim 4, further comprising:
    at least a second detector, wherein the light diffracted in said third direction is reflected off of a reflective surface of the transceiver module and directed toward the second detector, the second detector receiving the light diffracted in the third direction and converting the received light into electrical energy.

6. The optical transceiver module of claim 5, wherein said reflective surface of the transceiver module corresponds to an inner surface of a lid that at least partially covers at least the light source and the first and second detectors.

7. The optical transceiver module of claim 6, further comprising:
an optical wavelength-dependent filter device disposed between the reflective surface and the second detector, the filter device output intensity varies with input intensity and wavelength of light diffracted in the third direction except for one or more wavelengths of light of interest such that only wavelengths of light of interest are received by the second detector and converted into electrical energy.

8. The optical transceiver module of claim 3, wherein the reflector is a 45° front facet reflector comprising at least a mirroring surface and a mounting surface, the diffraction grating being formed on or in the mirroring surface, and wherein the mounting surface is mounted to a submount assembly of the transceiver module, the mounting surface of the reflector being at substantially a 45° angle relative to the mirroring surface, and wherein the light source is an edge emitting laser diode having a front facet and a rear facet, the reflector being mounted on the submount assembly such that light emitted from the front facet of the laser diode is collimated by a lens and directed onto the mirroring surface of the reflector.

9. A reflector for use in an optical transceiver module, the reflector comprising:
a mirroring surface;
a diffraction-inducing structure formed on or in the mirroring surface;
a mounting surface for mounting the front facet reflector to a submount assembly of an optical transceiver module, the mounting surface being at substantially a 45° angle relative to the mirroring surface; and
wherein light that is incident on the mirroring surface having the diffraction-inducing structure thereon or therein is redirected away from the mirroring surface as +1 order light, 0 order light and −1 order light, the 0 order light corresponding to light that is redirected in a first direction, the first direction being at substantially a 90° angle relative to the mounting surface, the +1 order light corresponding to light that is redirected in a second direction, the second direction being different from the first direction, the −1 order light corresponding to light that is redirected by the diffraction grating in a third direction, the third direction being different from the first and second directions.

10. A method for directing light in an optical transceiver module, the method comprising:
providing a reflector in an optical transceiver module and positioning the reflector to receive at least a portion of light produced by a light source of the transceiver module, the reflector having at least a mirroring surface and a mounting surface, the reflector having a diffraction-inducing structure formed on or in the mirroring surface, the mounting surface of the reflector being mounted to a submount assembly of the optical transceiver module, the mounting surface being at substantially a 45° angle relative to the mirroring surface, and wherein the mirroring surface reflects at least a portion of the received light in a first direction, the diffraction-inducing structure diffracting at least a portion of the received light in at least a second direction, the second direction being different from the first direction; and
providing at least a first detector in the optical transceiver module, the first detector receiving at least a portion of the light redirected in the second direction and converting the received redirected light into electrical energy.

11. The method of claim 10, wherein the light redirected in the second direction is reflected off of a reflective surface of the transceiver module and directed toward the first detector such that the light received by the detector is the light reflected off of the reflective surface of the transceiver module.

12. The method of claim 11, further comprising:
providing at least a second detector, the second detector receiving at least a portion of the light redirected in the third direction and converting the received redirected light into electrical energy.

13. The method of claim 12, wherein the light redirected in the third direction is reflected off of the reflective surface of the transceiver module and directed toward the second detector such that the light received by the second detector is light reflected off of the reflective surface of the transceiver module.

14. The method of claim 13, wherein said reflective surface of the transceiver module corresponds to an inner surface of a lid that at least partially covers at least the light source and the first and second detectors.

15. The method of claim 14, further comprising:
providing an optical wavelength-selective filter device in the transceiver module disposed between the reflective surface and the second detector, the filter device filtering out all wavelengths of light diffracted in the third direction except for one or more wavelengths of light of interest such that only wavelengths of light of interest are received by the second detector and converted into electrical energy.

* * * * *